US 6,561,720 B2

(12) United States Patent
Wirth et al.

(10) Patent No.: US 6,561,720 B2
(45) Date of Patent: May 13, 2003

(54) AXIAL SECURING DEVICE FOR TWO COMPONENTS BY MEANS OF A LOCKING RING

(75) Inventors: Alfred Wirth, Schweinfurt (DE); Andreas Keidel, Zeil (DE); Steffen Heyn, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 117 days.

(21) Appl. No.: 09/823,209

(22) Filed: Mar. 30, 2001

(65) Prior Publication Data

US 2001/0038771 A1 Nov. 8, 2001

(30) Foreign Application Priority Data

Mar. 30, 2000 (DE) .......................................... 100 15 911

(51) Int. Cl.[7] .................................................. F16B 1/00
(52) U.S. Cl. ........................ 403/280; 403/282; 403/297; 403/314; 403/354; 403/366; 403/367; 403/368; 285/321; 285/336; 285/340; 285/346
(58) Field of Search ................................ 403/282, 280, 403/281, 279, 297, 314, 319, 316, 315, 354, 355, 361, 366, 367, 365, 368, 369; 285/321, 340, 902, 305, 336, 339, 341, 343, 346, 345

(56) References Cited

U.S. PATENT DOCUMENTS

| 2,055,151 | A | * | 9/1936 | Jones |
| 3,731,955 | A | * | 5/1973 | Borsum et al. ............. 285/111 |
| 4,082,321 | A | * | 4/1978 | Nakajima et al. ............ 285/39 |
| 4,116,478 | A | * | 9/1978 | Yamaji et al. ............... 285/302 |
| 4,124,233 | A | * | 11/1978 | Ahlstone ....................... 285/18 |
| 4,486,036 | A | * | 12/1984 | Storke et al. ................ 285/253 |
| 4,930,816 | A | * | 6/1990 | Biing-Yih ..................... 285/321 |
| 5,005,877 | A | * | 4/1991 | Hayman ...................... 285/315 |
| 5,112,089 | A | * | 5/1992 | Richard ....................... 285/321 |
| 5,176,414 | A | * | 1/1993 | Daniele ....................... 285/321 |
| 5,230,538 | A | * | 7/1993 | Kobayashi ................... 285/316 |
| 5,419,594 | A | * | 5/1995 | Nelms ......................... 285/315 |
| 5,431,454 | A | * | 7/1995 | Calmettes et al. ............. 285/3 |
| 5,527,073 | A | * | 6/1996 | Readman ..................... 285/340 |
| 5,570,910 | A | * | 11/1996 | Highlen ....................... 285/308 |
| 5,613,714 | A | * | 3/1997 | Toshima et al. ............... 285/39 |
| 5,685,575 | A | * | 11/1997 | Allread et al. ................ 285/39 |
| 5,707,085 | A | * | 1/1998 | Kubiak ......................... 285/86 |
| 5,709,415 | A | * | 1/1998 | Witter ......................... 285/304 |
| 5,813,705 | A | * | 9/1998 | Dole ........................... 285/321 |
| 5,897,060 | A | * | 4/1999 | Kon et al. .................... 239/223 |
| 5,897,146 | A | * | 4/1999 | Saito et al. ............... 285/145.3 |
| 5,927,761 | A | * | 7/1999 | Bartholomew .............. 285/114 |
| 6,019,399 | A | * | 2/2000 | Sweeney .................... 285/248 |
| 6,044,939 | A |   | 4/2000 | Förster ..................... 188/266.6 |

* cited by examiner

Primary Examiner—Christopher J. Novosad
(74) Attorney, Agent, or Firm—Cohen, Pontani, Lieberman & Pavane

(57) ABSTRACT

An open end of a hollow cylindrical body receives part of a cylindrical component, where the hollow cylindrical body and the cylindrical component each having a groove, the grooves being aligned when the cylindrical component is in its intended final position with respect to the hollow cylindrical body, so that a locking ring is captured by the two grooves. The cylindrical component works together with the hollow cylindrical body to form a ring-shaped space, which extends from one of the two grooves toward the open end of the hollow cylindrical body, thus offering access for a tool to move the locking ring into its intended final position.

12 Claims, 5 Drawing Sheets

Fig. 2
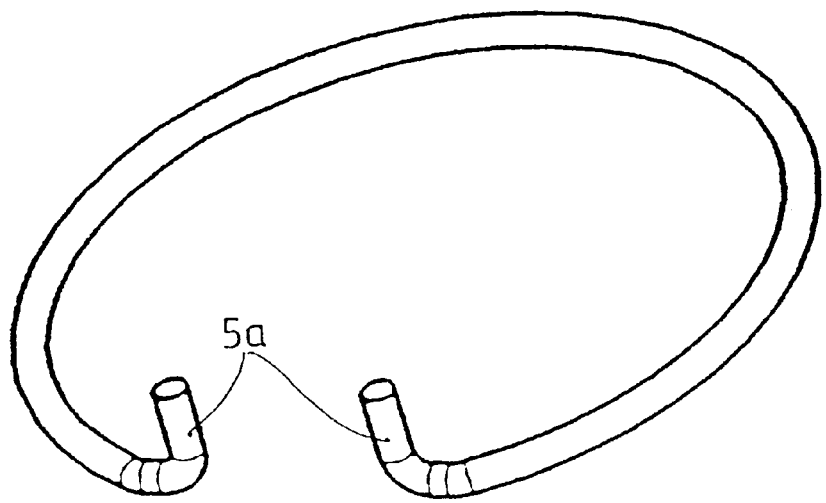

AXIAL SECURING DEVICE FOR TWO COMPONENTS BY MEANS OF A LOCKING RING

BACKGROUND OF THE INVENTION

1. Field of the Invention

The invention pertains to an axial securing device for a cylindrical component received in the open end of a hollow cylindrical body, each part having a groove which aligns with the groove of the other part to capture a locking ring between the grooves.

2. Description of the Related Art

U.S. Pat. Ser. No. 6,044,939 discloses an adjustable valve, the receptacle of which is locked axially in place in a socket piece, designed as a hollow cylindrical body, by a locking ring. The receptacle has a circumferential groove, which accepts the entire locking ring as the receptacle is pushed into the socket piece. Once the receptacle has reached its intended final position, this groove lines up with another groove in the socket piece. The locking ring can then expand radially and thus assumes a diameter which overlaps the grooves in the socket piece and in the receptacle. Thus the receptacle is secured axially inside the socket piece.

The problem is that it is difficult to tell from the outside whether the locking ring has in fact assumed its intended final position. If this assembly step is performed by hand, it is possible to check the results and to repeat the step if necessary. Within the scope of industrial fabrication, it is possible to check the results of the step, but it is impossible to repeat the assembly procedure.

SUMMARY OF THE INVENTION

The object of the present invention is to improve the axial securing device using a locking ring so that the locking ring can be installed reliably.

In accordance with the invention, the cylindrical component works together with the hollow cylindrical body to form a ring-shaped space for the locking ring. This space starts from one of the two grooves and extends toward the open end of the hollow cylindrical body, thus providing access for a tool to move the locking ring into its intended final position.

The advantage of this measure is that a locking ring, which could not be inspected or accessed in any way after it had assumed its final position, can now be installed reliably. If the locking ring cannot assume its intended final position immediately as a result of an unfavorable combination of tolerances of the parts to be connected, this condition can be remedied by means of a simple tool.

To obtain the best possible access to the locking ring, the ring-shaped space is designed to extend all the way around. The ring-shaped space can also be designed in the form of a pocket extending over a certain length of arc.

Thus the tool is formed by an element in the form of a ring or at least a part of a ring. This tool is simply pressed into the ring-shaped space to push the locking ring into its intended final position.

So that the tool can exert an effective installing force on the locking ring, the ring-shaped element is elastic, and, when it is not being used, it has a nominal diameter larger than that of the ring-shaped space.

To form the ring-shaped space, one of the axially secured components has a diameter change section, beginning from the groove, the diameter changing in the direction toward the base of the groove, so that an end part of the tool can be guided between the base of the groove and the locking ring.

To improve the retaining effect of the locking ring, the part of the tool which rests radially against the locking ring has a shoulder at the end facing the open end of the hollow cylindrical body, this shoulder representing a contact surface for the locking ring. The locking ring thus cannot be pulled into the ring-shaped space under load.

To facilitate the installing movement of the tool onto the locking ring, the diameter change section has a conical surface, which comes to rest against a lateral surface of the tool.

For the purpose of minimizing the contact pressure, at least a certain section of the tool also has a conical lateral surface, which conforms to the conical surface of the diameter change section.

In a further advantageous design, the tool has a circumferential collar, which comes to rest against an axial, ring-shaped end surface on the hollow cylindrical body after the tool has been inserted to the maximum extent. This prevents the tool from being pushed into the ring-shaped space beyond a reasonable distance.

The tool also has at least one radially oriented rib, which is supported axially against a contact surface on the cylindrical component or on the hollow cylindrical body. This rib serves as a guide, which signals that the tool has been pushed far enough into the ring-shaped space to guarantee that the locking ring has reliably assumed its final position.

The tool can also be considered a "lost" part, which remains in the ring-shaped space after assembly. The advantage of this measure is that the tool cannot be removed by tinkerers from the ring-shaped space without damage and thus serves as a safety device to protect against unwanted manipulation of the axial securing device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows the locking ring;

DETAILED DESCRIPTION OF THE PRESENTLY PREFERRED EMBODIMENTS

Figure 1:
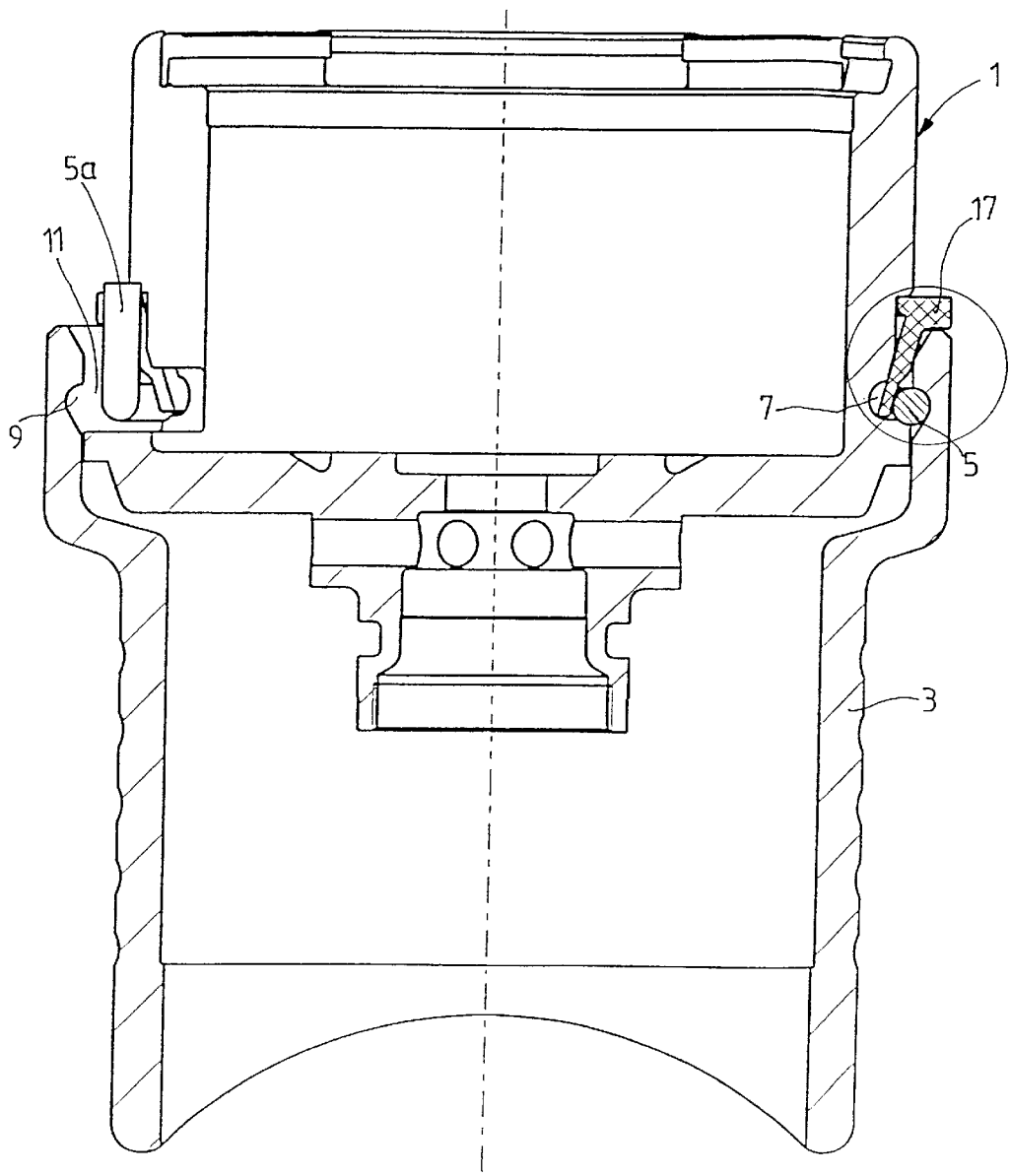
FIG. 1 shows a cross section through two components connected by an axial securing device.

FIG. 1 shows the cylindrical component 1. In this case, the component is a receptacle for a valve, but the application of the invention is in no way limited to this application. This receptacle is designed to be inserted into a hollow cylindrical body 3. A locking ring 5 has the job of locking the two cylindrical components together axially. In FIG. 2, the locking ring is shown as an individual part, so that the bent ends 5a provided to facilitate installation can be seen more clearly. The bent ends can be squeezed together with simple pliers, so that the locking ring can be inserted into a groove 7 in the cylindrical component 1. Then the cylindrical component with the compressed locking ring 5 is guided into the open end of the hollow cylindrical body, so that the locking ring can now lock itself into the groove 9 in the hollow cylindrical body.

Figure 3:
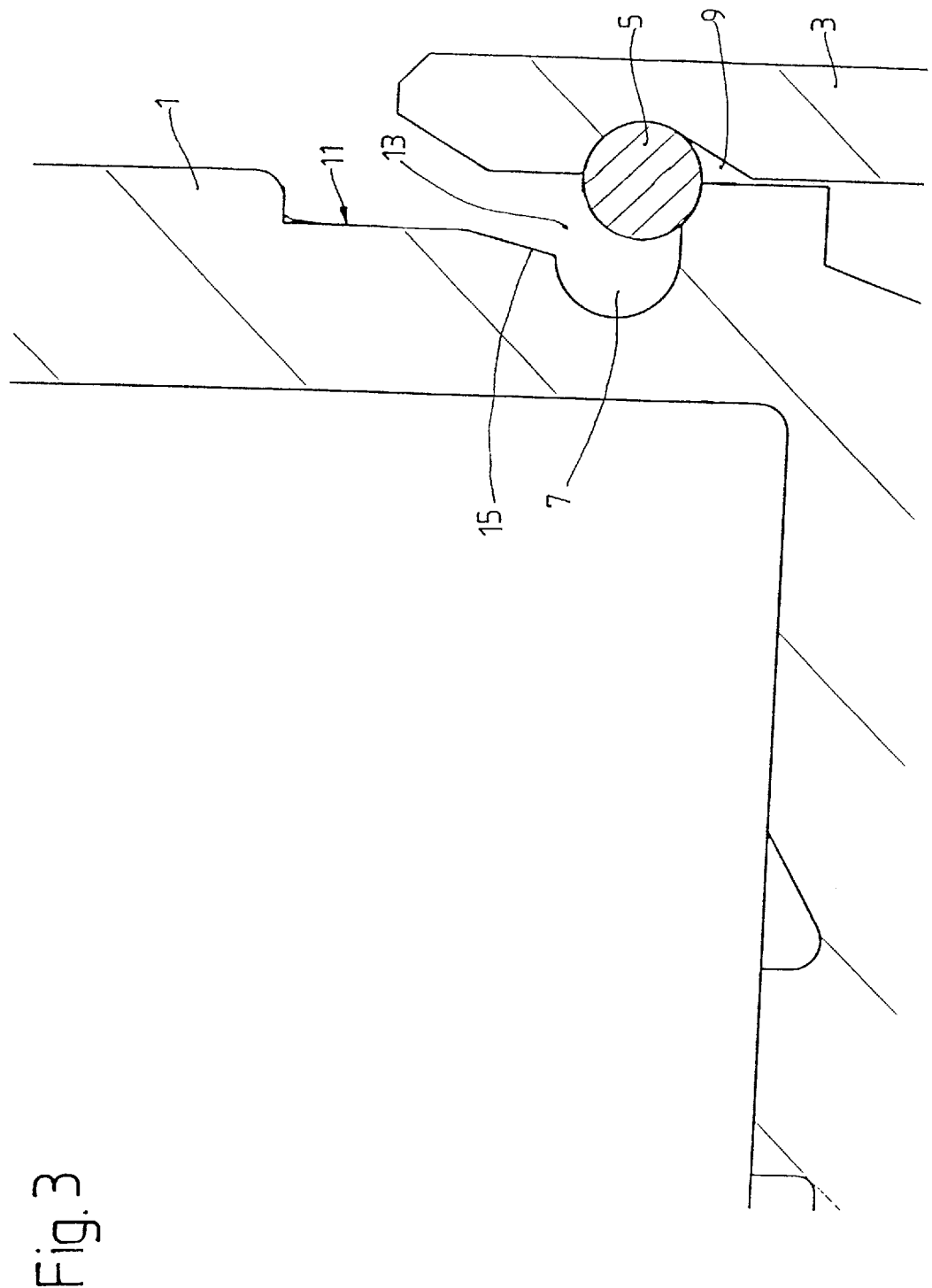
FIG. 3 shows a section of FIG. 3 without the tool.

As can be seen in FIG. 3, which shows a part of FIG. 1, a circumferential ring-shaped space 13 is created by a diameter change section 11, which in the present case represents a reduced diameter section of the cylindrical component 1. This space provides a clear view of the locking ring 5 and gives access to it. The diameter reduction extends from the groove 7 toward the free end of the hollow cylindrical body 3. A conical surface 15 expands the ring-shaped space 13 radially inward from the section 11 to the groove 7, so that the inside diameter of the locking ring 5 is accessible.

Figure 4:
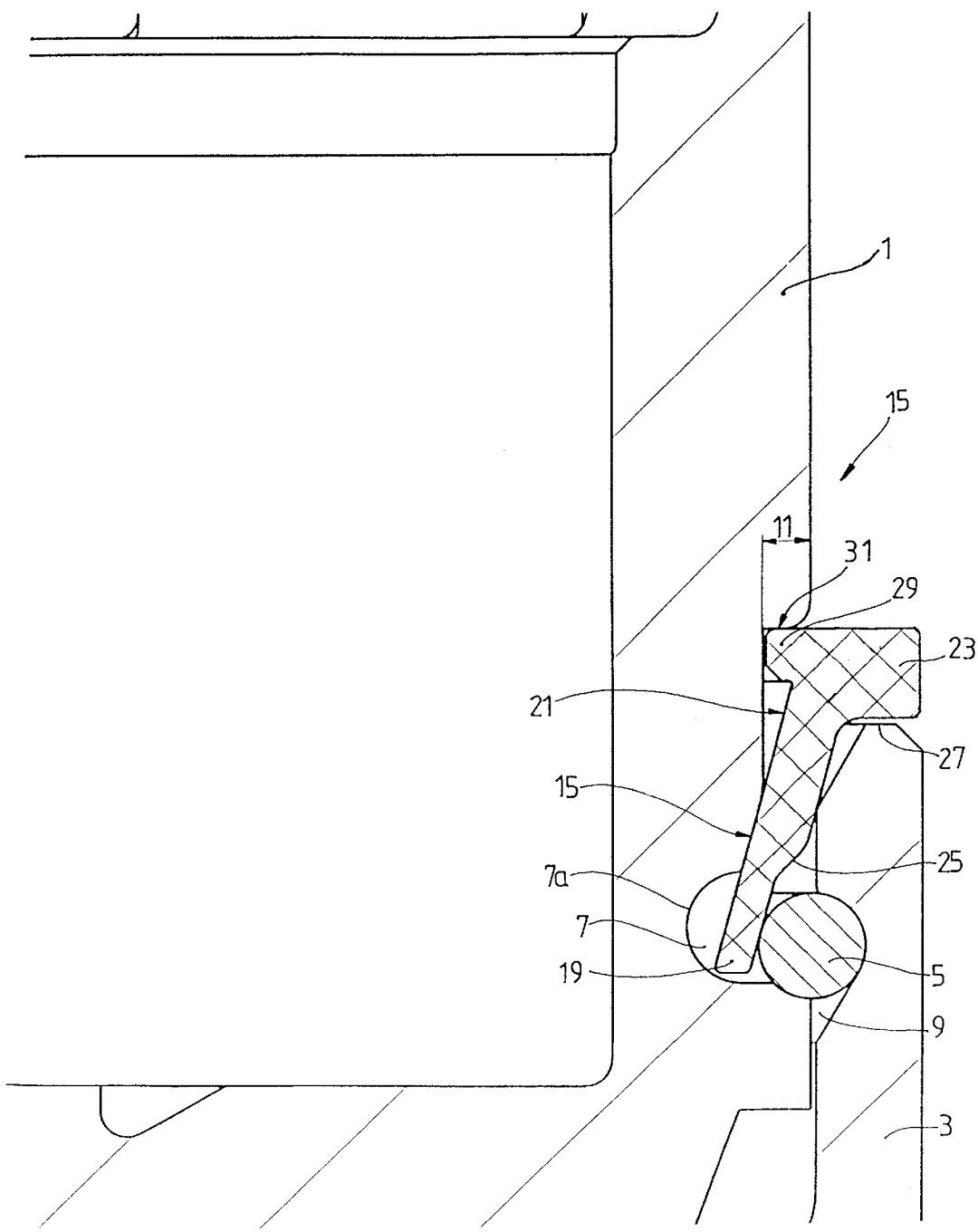
FIG. 4 is the same as FIG. 3 but with the tool.
Figure 5:
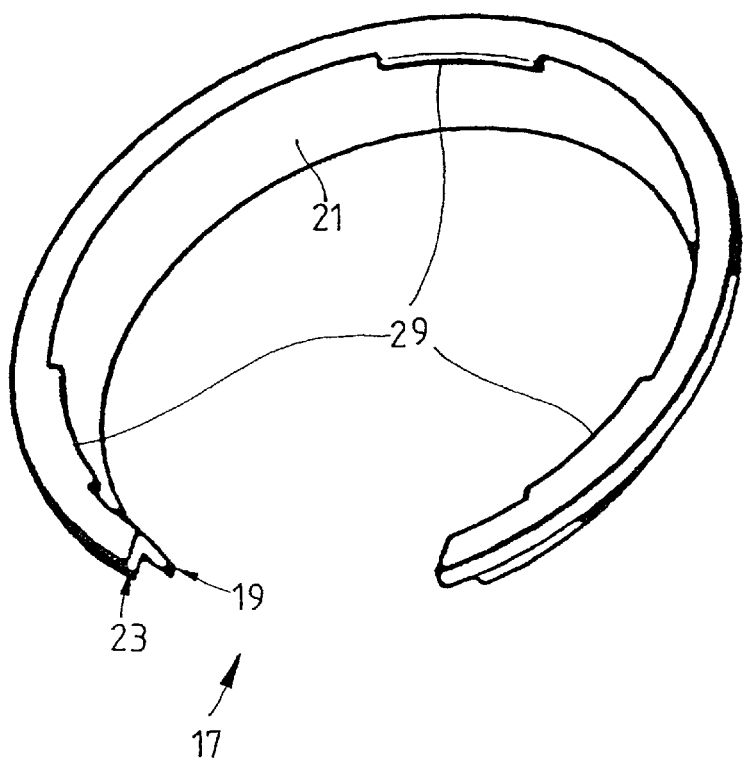
FIG. 5 shows the tool as an individual part.

FIG. 4 shows the part according to FIG. 1 with a tool 17, which has been introduced into the ring-shaped space 13. The tool is a ring-shaped element according to FIG. 5, which preferably consists of plastic. The ring-shaped element 17 can be limited to a certain length of arc, in order to provide clearance for the bent ends 50, in which case it is C-shaped. The ring-shaped space can then be designed as only a pocket. Before assembly, the C-shaped element has a nominal diameter which is larger than the nominal diameter of the ring-shaped space 13, so that the C-shaped element in FIG. 4 is under pretension acting radially outward. The C-shaped element 17 has an end part 19 extending between the base 7a of the groove 7 and the locking ring, so that the part 19 acts in the radial direction on the locking ring 5. This is followed by an intermediate section with a conical inside surface 21, which is itself followed by a circumferential collar 23.

The end part 19, which rests radially against the locking ring 5, has a shoulder 25 facing the open end of the hollow cylindrical body 3; this shoulder can serve as a contact surface for the locking ring. The conical surface 15 of the reduced diameter section 11 in the ring-shaped space 13 and the conical inside surface 21 of the ring-shaped element 17 ensure that the ring-shaped element will expand radially outward to move the locking ring 5 into the intended final position. The collar 23, provided radially on the outside, represents an insertion boundary for the ring-shaped element 17 in the direction toward the ring-shaped space 13, in that the collar 23 abuts a circumferential ring-shaped end surface 27 of the hollow cylindrical body 3. At least one radially inward-directed rib 29 on the ring-shaped element 17 comes to rest against a shoulder 31 bounding the reduced diameter section 11 of the cylindrical component 1 when the intended minimum installation depth of the ring-shaped element has been reached. In this condition, the ring-shaped element 17 is clamped between the locking ring 5, the conical surface 15, and the shoulder 31. The ring-shaped element remains in the ring-shaped space and serves, among other things, to foil any unwanted attempts by tinkerers to open the device.

The ring-shaped element can also be used as a normal tool and be removed from the ring-shaped space after the locking ring 5 has been successfully installed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An axial securing device comprising
   a hollow cylindrical body having an open end and an inward facing groove axially spaced from said end,
   a cylindrical component which is received in said open end of said hollow cylindrical body, said cylindrical component having an outward facing groove which is radially aligned with said inward facing groove when said cylindrical component is received in said hollow cylindrical body in an assembled position,
   a locking ring captured between said grooves when said cylindrical component is received in said hollow cylindrical body in said assembled position, said locking ring having a pair of bent ends which can be squeezed together to insert said locking ring in said outward facing groove, said locking ring being loaded outward into said inward facing groove,
   a ring-shaped space between said cylindrical component and said hollow cylindrical body, said ring-shaped space extending from said outward facing groove toward said open end, and
   a C-shaped element received in said ring-shaped space in said assembled position for holding said locking ring in said inward facing groove, said C-shaped element having an end part which is received in said outward facing groove and rests radially against the locking rings.

2. An axial securing device as in claim 1 wherein said ring-shaped space extends around the entire circumference of said cylindrical component.

3. An axial securing device as in claim 1 wherein said C-shaped element is an elastic element having a nominal diameter, when not in place in said ring-shaped space, which is greater than the diameter of said ring-shaped space.

4. An axial securing device as in claim 1 wherein said ring-shaped space is formed by a diameter change section in one of said cylindrical component and said hollow cylindrical body, said diameter change section adjoining the outward facing groove in the cylindrical component.

5. An axial securing device as in claim 4 wherein said diameter change section comprises a conical surface adjoining said outward facing groove, said C-shaped element having a lateral surface which abuts said conical surface of said diameter change section.

6. An axial securing device as in claim 5 wherein said lateral surface is a conical lateral surface which conforms to the conical lateral surface of the diameter change section.

7. An axial securing device as in claim 4 wherein said diameter change section is bounded by a shoulder in said cylindrical component, said C-shaped element having a radially facing rib which engages said shoulder.

8. An axial securing device as in claim 1 wherein said C-shaped element has a shoulder adjacent to said end part, said shoulder facing the locking ring.

9. An axial securing device as in claim 1 wherein said open end of said hollow cylindrical body comprises a circumferential ring-shaped end surface, said C-shaped element having a collar which abuts said end surface when said C-shaped element is received in said ring-shaped space.

10. An axial securing device comprising
- a hollow cylindrical body having an open end and an inward facing groove axially spaced from said end,
- a cylindrical component which is received in said open end of said hollow cylindrical body, said cylindrical component having an outward facing groove aligned with said inward facing groove, and a reduced diameter section which extends from said outward facing groove toward said open end, thereby forming a ring-shaped space between said cylindrical component and said hollow cylindrical body,
- a locking ring captured between said grooves, and
- a C-shaped element received in said ring-shaped space for keeping said locking ring captured between said grooves.

11. An axial securing device as in claim 10 wherein said reduced diameter section comprises a conical surface extending from the outward facing groove toward the open end, said C-shaped retaining element having a conical inside surface which abuts said conical surface of said reduced diameter section.

12. An axial securing device as in claim 10 wherein said reduced diameter section is bounded by a shoulder, said C-shaped element having a radially facing rib which engages said shoulder.

* * * * *